(12) United States Patent
Kumar et al.

(10) Patent No.: US 9,817,388 B2
(45) Date of Patent: Nov. 14, 2017

(54) METHOD AND APPARATUS FOR PRESERVING STRUCTURAL INTEGRITY OF 3-DIMENSIONAL MODELS WHEN PRINTING AT VARYING SCALES

(71) Applicant: Adobe Systems Incorporated, San Jose, CA (US)

(72) Inventors: Abhishek Kumar, New Delhi (IN); Naveen Prakash Goel, Noida (IN); Mayur Hemani, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1009 days.

(21) Appl. No.: 14/092,432

(22) Filed: Nov. 27, 2013

(65) Prior Publication Data
US 2015/0148930 A1 May 28, 2015

(51) Int. Cl.
G06F 17/50 (2006.01)
G05B 19/4099 (2006.01)
G06T 19/20 (2011.01)

(52) U.S. Cl.
CPC .......... G05B 19/4099 (2013.01); G06T 19/20 (2013.01)

(58) Field of Classification Search
CPC .......................... G05B 19/4099; G06T 19/20
See application file for complete search history.

(56) References Cited

U.S. PATENT DOCUMENTS

2011/0087350 A1* 4/2011 Fogel ................... G06F 17/50
700/98
2014/0039659 A1* 2/2014 Boyer ................ B29C 67/0051
700/98

OTHER PUBLICATIONS

J. Cagan, K. Shimada, S. Yin, "A survey of computational approaches to three-dimensional layout problems", Computer-Aided Design vol. 34 (2002) pp. 597-611.*

* cited by examiner

*Primary Examiner* — Kamini S Shah
*Assistant Examiner* — Steven Crabb
(74) *Attorney, Agent, or Firm* — Keller Jolley Preece

(57) ABSTRACT

A computer implemented method and apparatus for preserving structural integrity of 3-D models when printing at varying scales, by use of a cueing model.

20 Claims, 13 Drawing Sheets

METHOD AND APPARATUS FOR PRESERVING STRUCTURAL INTEGRITY OF 3-DIMENSIONAL MODELS WHEN PRINTING AT VARYING SCALES

BACKGROUND

Field of the Invention

Embodiments described herein relate to 3-Dimensional (3-D) printing, and more particularly, to a method and apparatus for preserving structural integrity of 3-D models when printing at varying scales.

Description of the Related Art

3-D printing is an "additive" manufacturing process, where a 3-D printer operates like a layering machine. Each layer can be considered a 2-Dimensional (2D) (x-y) area quantized into discrete points of data laid down by a "print head" of the 3-D printer. The print head can emit light or material in a raster or grid format (i.e., x-y). Each point, and therefore each 2D layer, typically also has a uniform height z. For printing a 3-D model in an x-y-z voxel grid, multiple 2D layers of quantized data of height z are additively combined one above the other (or below the other, depending on the specific type of 3-D printing process used), thereby manufacturing the 3-D model in a layer by layer process. Although an original mesh format of the 3-D model contains infinite data, upon conversion of the 3-D surface data into layers for 3-D printing, as described below, there is a necessary loss of data integrity due to quantization errors and alignment effects during the digital conversion and the layered printing process. Accordingly, fine details in the 3-D model may not be faithfully reproduced upon printing.

More specifically, if the layer thickness capability of the 3-D printer is 250 μm, and a detail of the 3-D model has a height in the z-axis direction of the voxel grid of 1000 μm, only four (that is, 1000/250) layers of voxel grid data would be available to reproduce that 1000 μm detail. Limitation to only four layers will obviously lead to a jagged and unfaithful reproduction of any portion of the 1000 μm detail that is not aligned with the z axis of the voxel grid. However, if the 3-D printing process included voxel layers of 15 μm each in the z-axis direction of the voxel grid, 66 layers (1000/15) of voxel grid data would be available to incrementally reproduce any portion of the 1000 μm detail that is not aligned with the z axis of the voxel grid. Thus, providing 66 layers to follow the details of the 3-D model in the z-axis direction instead of only 4 layers results in a more faithful reproduction of details of the 3-D model. Similarly, quantization and alignment errors in the x-axis and y-axis directions between the voxelized 3-D model and the voxel grid upon printing will also lead to unfaithful reproduction. As well known by those of ordinary skill in the art, quantization errors are "rounding off" errors that result when quantizing (converting) a value in a digital domain. Alignment errors in this context are position effects that result when attempting to align two different coordinate axis, such as the x, y, z axis of a volume representation of a 3-D model, with the x, y, z voxel grid that the head of a 3-D printer is constrained to follow when printing due to its physical design. Both of the quantization errors and the alignment errors can become exacerbated in dependence on differences of scale between the volume representation of the 3-D model and the voxel grid of the 3-D printer.

The possibility for unfaithful reproduction is even further complicated by the fact that 3-D printer software typically allows a user to select a desired scale upon printing, so as to adjust the size of the printed 3-D model. Changing the size of the 3-D model to be printed necessarily affects the size of the details to be reproduced, but does not change the amount of layers that the printer has in order to reproduce those details. As noted by the example above, a model with fewer layers leads to the possibility of increased quantization errors and alignment errors.

Therefore, there is a need for a method and apparatus for preserving structural integrity of 3-D models when printing at varying scales.

SUMMARY OF THE INVENTION

A method and apparatus for preserving structural integrity of 3-D models when printing at varying scales. The method extracts structural features from an original scale 3-D model. The extracted structural features provide detail relating to the shape of the original scale 3-D model. The extracted structural features are grouped so as to form a 3-D cueing model. The original scale 3-D model is then associated with the 3-D cueing model for use together when printing the 3-D model.

An apparatus for preserving structural integrity of 3-D models when printing at varying scales. The apparatus includes computer having one or more processors and further includes a 3-D model creation module for extracting structural features from an original scale 3-D model, wherein the structural features provide detail relating to the original scale 3-D model, for grouping the extracted structural features so as to form a 3-D cueing model, and for associating the original scale 3-D model with the 3-D cueing model for use together when printing. The apparatus also includes and a 3-D printing module for creating a test model from the original scale 3-D model, extracting structural features from the test model, adjusting the test model based on a comparison of the extracted structural features from the test model to the extracted structural features in the 3-D cueing model, and providing the adjusted test model as a 3-D model for printing.

A non-transient computer readable medium for storing computer instructions that, when executed by at least one processor causes the at least one processor to perform a method for preserving structural integrity of an original scale 3-D model when printing at varying scales. The method extracts structural features from an original scale 3-D model, which structural features provide detail relating to the shape of the original scale 3-D model. The extracted structural features are grouped so as to form a 3-D cueing model and the original scale 3-D model is associated with the 3-D cueing model for use together when printing.

These and other features and advantages of the present disclosure may be appreciated from a review of the following detailed description of the present disclosure, along with the accompanying figures in which like reference numerals refer to like parts throughout.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1B:
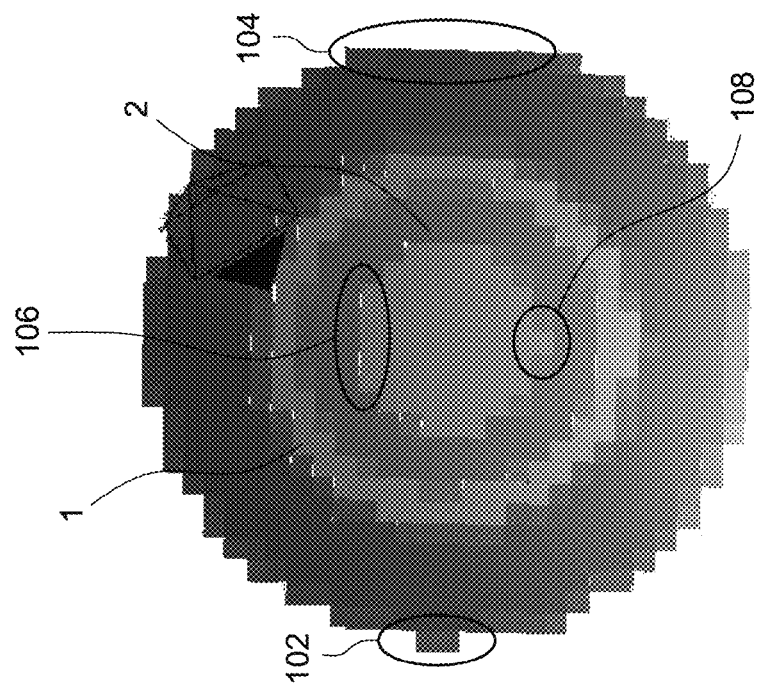
FIG. 1B illustrates the 2 concentric toruses of FIG. 1A after resizing and voxelization in preparation for printing.

While the method and apparatus is described herein by way of example for several embodiments and illustrative drawings, those skilled in the art will recognize that the method and apparatus preserving structural integrity of 3-D models when printing at varying scales is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus preserving structural integrity of 3-D models when printing at varying scales defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, the term "structural integrity" as it relates to the printing of a 3-D model includes a "faithful reproduction" of significant structural features of the 3-D model. Such significant structural features can be determined by algorithmic extraction of shapes in the model, such as block or plate shapes within the model that have a common axis or axes. Significant structural features can also be determined manually by visual inspection of the 3-D model. Furthermore, the term "package" is used herein to broadly describe the associative relationship between an original scale 3-D model and a corresponding 3-D cueing model, and is not limited to a containerized relationship.

DETAILED DESCRIPTION OF THE EMBODIMENTS

The 3D Printing Process

As previously noted, 3-D printing is an additive manufacturing process where a 3-D printer operates like a layering machine. Additive manufacturing takes a virtual blueprint from computer aided design (CAD) or animation modeling software, that is, an original 3-D model, and "slices" the 3-D model into digital cross-sections for the 3-D printer to successively use as a guideline for printing. Depending on the 3-D printer used, material or a binding material is deposited on a build bed or platform using a multi-layering process until material/binder layering is complete and the final 3-D model has been "printed."

A standard data file interface between CAD software and the 3-D printer is a Standard Tessellation Language or Stereo Lithography (.STL) file format. An STL file approximates the shape (surface) of an original 3D model by carrying information that defines the size, shape and position of a mesh of triangular facets. Smaller facets produce a higher quality surface.

Before performing a "print" of the 3-D model, the 3-D printer accesses the surface shape of 3-D model from an STL file, and converts the surface shape into a volume representation. The STL file is converted using, for example, a process known as voxelization. Voxelization converts geometric objects from their continuous surface geometric representation as found in an original 3-D model into a set of volume elements (or voxels) that best approximates the surface structure of a continuous object. Accordingly, voxelization creates a series of discrete points, each point having a specified depth in a spatial x, y, z grid, called a voxel grid. Each point in the voxel grid contains volume, and therefore 3-D models for printing created by voxelization have both a surface and a core.

Once a voxel grid of the 3-D model is created, it is sliced into layers having a height determined by the user in combination with the resolution capability of the 3-D printer. Printer resolution describes layer thickness (height in the z-axis direction) and X-Y resolution in dpi (dots per inch) or micrometers (μm). Typical layer thickness is around 15-100 micrometers (μm). The 3-D printer then lays down successive layers of liquid, powder, paper or sheet material (typically plastic) to build the model from a series of cross sections of the 3-D model. These layers, which correspond to the virtual cross-sections from the CAD model, are joined or automatically fused to create the final shape of the printed 3-D model. The primary advantage of this technique is its ability to create almost any shape or geometric feature.

Problem of Scaling

Figure 1A:
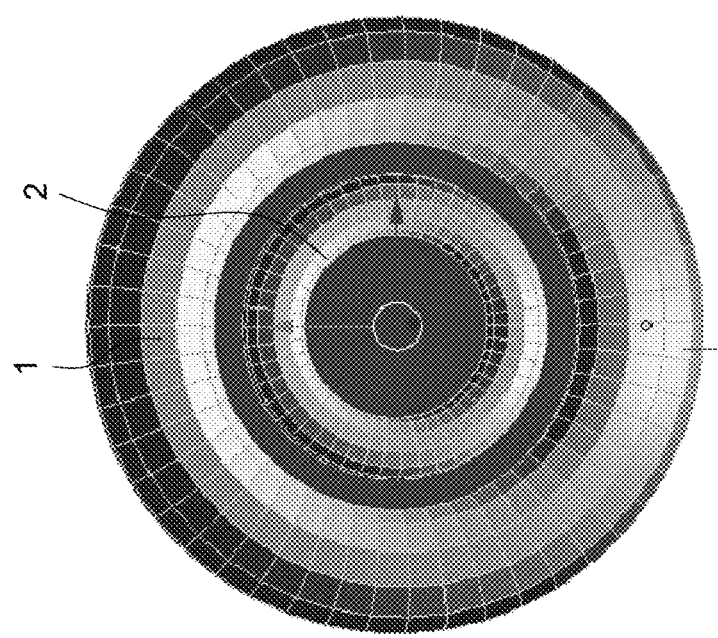
FIG. 1A illustrates a top view of an original scale 3-D model comprising two concentric toruses.

A user typically scales the size of a 3-D model for printing from an original size (such as an 11 foot long dimension for the model of an automobile) to a smaller size (such as 1/40 scale). Although the original scale of the 3-D model can be faithfully printed relatively easily using a printer having a conventional resolution capability as noted above, when printing at 1/40 scale, the 3-D printer will necessarily have $1/40^{th}$ of the amount of layers to faithfully reproduce the 3-D model in the z-axis direction. As described in detail elsewhere in this application, when less layers are available, the 3-D model may not be faithfully reproduced upon printing For example, FIG. 1A illustrates a top view of an original scale 3-D model comprising two concentric toruses, a first torus 1 that concentrically surrounds a second torus 2. FIG. 1B illustrates the two concentric toruses 1 and 2 of FIG. 1A after resizing and voxelization for printing in accordance with well-known and standard techniques. The original scale 3-D model is supplied, for example, from a CAD software application. The FIG. 1A representation is a continuous surface format, and hence very accurately reflects the original scale 3-D model. However, after a user resizes the original scale 3-D model to a desired scale for printing, and then digitizes the rescaled model information into a quantization of, for example 100 layers of information in a format suitable for 3-D printing, such as by voxelization, spatial errors naturally (although not necessarily) appear in one or more layers of the voxelized data (the voxel grid of the 3-D model). As described in detail elsewhere in this application, such spatial errors result from quantization and alignment errors in the various axial directions between the voxelized 3-D model and the voxel grid upon printing. These spatial errors can easily result in structural distortions that cause unfaithful reproduction of the 3-D model upon printing. More specifically, as shown in FIG. 1B, note that voxelization has caused curved surfaces of the larger torus and the smaller torus shown to have a similar shape in FIG. 1A, to now have a different shape in the voxel grid; as evident by comparing the number of voxels in area 102 to the number of voxel's in area 104, as well as by comparing the number of voxels in area 106 to the number of voxels in area 108. Similar distortions can also be found in other axial and diagonal directions of the voxel grid. Such distortions of surfaces and structural features of the 3-D model result in unfaithful reproduction of the printed 3-D model.

Hence, there is a need for a method and apparatus for preserving structural integrity of 3-D models when printing at varying scales.

Overview of Description

As noted above, in order to "print" a 3-D model, the 3-D printer accesses the surface shape of 3-D model from an STL file, and converts the surface shape into a volume representation. In accordance with the embodiments described herein, a cueing model is packaged with STL file for the 3-D model. The cueing model is also an STL file, and provides "cues" for use when preparing the 3-D model for printing. More specifically, the cues correspond to a listing of significant features of the 3-D model. The significant features are those for which their size, position and shape should be retained in any re-sized version the 3-D model prepared for printing in order to faithfully reproduce the re-sized 3-D model upon printing.

The volume representation of the 3-D model is typically scaled by a user before printing to be of a size different from an original size of the 3-D model, thereby introducing the possibility of unfaithful reproduction of the re-sized 3-D model.

Thus, embodiments of the method and apparatus preserving structural integrity of 3-D models when printing at varying scales by use of a 3-D cueing model can be divided into three basic steps:

1. Creation of a cueing model,
2. Adjustment, if necessary, of the created cueing model into a final cueing model, and
3. Creation of an optimal 3-D model for printing, using the final cueing model as a guide.

Step 1: Creation of the Cueing Model

The digital original 3-D model is accessed, typically by someone knowledgeable concerning what a faithful reproduction of the 3-D model would look like. Typically, a creator of the digital 3-D model (sometimes hereinafter called an author) knows what their creation should look like. Creators of digital 3-D models typically use well known computer modeling software to digitally create a virtual 3-D model as a digital representation of a physical embodiment of a 3-D model. Such creators typically use 3-D model creation software which operate on a computer. PHOTOSHOP® and SOLIDWORKS® are two examples of suitable 3-D model creation software tools. One intended use of the created digital 3-D model is that it be provided to a user who will apply the 3-D model to a 3-D printer in order to re-create the physical representation of the digital 3-D model. As noted above, it is desirable that the re-created physical representation be a faithful reproduction of the original 3-D model intended by the creator. Thus, in accordance with embodiments described herein, structural features are extracted from the original 3-D model, which structural features provide significant detail relating to the shape of the original scale 3-D model. The position, size and shape of the extracted structural features are provided as a set of significant features, thereby forming the 3-D cueing model.

In order to help ensure that the relative position, size and shape of the significant features of the 3-D cueing model maintain their relative correspondence in spite of a re-sizing of the original 3-D model, the author of the cueing model scales the original 3-D model to a 3-D model re-sized for printing. For example, the author may re-size the original 3-D model to $1/10^{th}$ the size (using known digital processing techniques) and then extract significant features from the $1/10^{th}$ re-sized 3-D model. The extracted significant features are then re-sized by a factor of 10/1 back to the original size of the 3-D model (using known digital processing techniques) and the position, size and shape of the re-sized extracted significant features are visually compared by the author to the position, size and shape of corresponding significant features extracted from the original 3-D model.

Step 2: Adjustment, if Necessary, of the Created Cueing Model into a Final Cueing Model If the position, size and shape of the re-sized extracted significant features, after comparison by the author to the position, size and shape of corresponding significant features extracted from the original 3-D model, results in a difference greater than a threshold, at least one of the position, size and shape of the significant features of the 3-D cueing model are adjusted so as to minimize the difference. The author iteratively performs this process for a plurality of scale changes of the original 3-D model, so as to develop, if necessary, one or more optimized cueing models. Each cueing model comprises a set of significant features having a relative position, size and shape optimized for comparing with significant features of an original 3-D model scaled within a range of corresponding sizes.

Step 3: Creation of an Optimal 3-D Model for Printing, Using the Final Cueing Model When a user desires to print a digital 3-D model that the user has accessed or otherwise been provided, in accordance with embodiments described herein, the 3-D model, typically re-sized by the user before printing, is processed to extract significant features. Extraction of the significant features from the 3-D model re-sized for printing is performed in the same manner as the extraction of the significant features from the original 3-D model in order to form the cueing model, details of which are provided later in this description. The size, shape and position of the extracted significant features from the 3-D model re-sized for printing are compared with the size, shape and position of the significant features that are provided in the cueing model. Comparison is necessary because if features determined to be significant for having a faithful reproduction are not of the same size, position and shape in the 3-D model re-sized for printing, then upon printing of the 3-D model re-sized for printing, it will most likely be visibly different from the digital original 3-D model. Thus, based on the comparison, the embodiments adjust the 3-D model re-sized for printing so that the relative position, size and shape of the extracted significant features of the 3-D model re-sized for printing correspond, within a predetermined threshold of design choice, with the position, size and shape of corresponding significant features in the cueing model. Such adjustments attempt to ensure a consistent cross-sectional area for the extracted features within and across multiple layers of the 3-D model during the 3-D printing process. If the corresponding significant features in the 3-D model re-sized for printing do not have consistent cross-sectional area within and across their multiple layers, then their position, size and shape will no longer correspond with the position, size and shape of the corresponding significant features in the cueing model. As noted above, such lack of correspondence leads to unfaithful reproduction, as determined by the author of the 3-D cueing model.

The thus adjusted re-sized volume representation of the 3-D model for printing is then applied to a 3-D printer for printing. Upon printing of the adjusted and re-sized volume representation of the 3-D model for printing, a resized version of the original sized 3-D model should be faithfully reproduced.

Advantages

Embodiments described herein create a 3-D cueing model which is packaged for access by 3-D printer software along with an original scale 3-D model. Upon access of the 3-D model and the 3-D cueing model in preparation for printing of the 3-D model, the cueing model is adaptively used by the printing software to modify processing of the 3-D model to ensure that when the 3-D model is resized from its original scale to be prepared for printing at a given scale, the shape of the printed resized model will more faithfully reproduce the shape of the original scale 3-D model. Use of the 3-D cueing model as a guide during the printing process helps ensure that when an original scale 3-D model is scaled down to, for example, a small print size, chance effects of quantization and voxel grid alignment errors do not cause significant deformation of the small features of the scaled down model. Furthermore, there is a loss of precision when a tessellated mesh is created from a precise parametric geometry (that is, when many small flat surfaces are meshed together in an attempt to form a curved surface, there is a loss of detail). Thus, when a tessellated mesh of 3-D model is scaled up to a larger print size, differences between the enlarged tessellated surfaces and the original precise parametric form becomes exacerbated. Therefore, when a 3-D model is scaled up to a larger size, the 3-D cueing model is used as a guide to augment the tessellated mesh of the 3-D model during the printing process, to help ensure that such surface differences are not exacerbated.

Even furthermore, as noted above, some embodiments allow the author of the 3-D cueing model to iteratively adjust the 3-D cueing model, if necessary, so as to make specific sets of cueing model data corresponding to specific ranges of print scale (i.e., resizings of the original scale 3-D model). Correlation of a specific 3-D cueing model to a specific range of print scale helps protect detail in the printed 3-D model from distortion/unfaithful reproduction upon printing.

Structural features in the resized 3-D model for printing should maintain their relative position, size and shape relationship with corresponding structural features in the original mesh representation of the 3-D model (so as to have a consistent cross-sectional area within and across multiple layers during the 3-D printing process). Without use of a 3-D cueing model as a guide during 3-D printing, such structural features can vary as a result of the layering process, depending on any small difference of how the mesh representation happens to spatially align with a layer of the voxel grid to be printed, as well as resolution restrictions presented by the 3-D printer.

Thus, as described above, the embodiments provide and use a 3-D cueing model so as to improve 3-D print quality by scale adaptive adjustment of a digitized volume representation of the accessed 3-D model before printing, so as to preserve the structural integrity of the 3-D model when printing at a desired scale by a user. After the 3-D model has been resized by the printer software to a scale desired by the user before printing, which resized 3-D model is now referred to as a test model, the position, size and shape of structural features from the test model are extracted. During printing, the printer software uses the 3-D cueing model, comprised of extracted structural features of the original scale 3-D model, to adaptively adjust the test model, which test model becomes the resized 3-D model for printing after any adjustment that may be needed. More specifically, the printer software adaptively controls the printing process so that when the resized test model is used as the 3-D model for printing, the extracted structural features of the test model are proportionally positioned, sized and spaced with respect to corresponding structural features of the original scale 3-D model. The cueing model may be arranged so as to indicate a plurality of sets of extracted structural features, where each set is used for a different one or more of a plurality of ranges in print scale. After adjustment of the test model so that the extracted structural features are proportionally positioned, sized and spaced substantially the same as those in the cueing model, the adjusted test model is provided for use as the 3-D model for printing.

In some embodiments, the 3-D model may not require specialized cueing (hinting) when printing the 3-D model at any one of a plurality of different scale and slicing factors, in which case a single cueing model is applicable for use when printing at any scale.

In the illustrated embodiments the extracted structural features are blocks, and the size, position and shape of the blocks are used to control slicing of the voxelization grid during the layering portion of the printing process, by maintaining: 1) Alignment (grid fitting) of the extracted structural features; 2) Weight (consistent block cross-section area) of the extracted structural features; and 3) Spacing (consistent inter-block separation) of the extracted structural features. In other embodiments, structural features other than blocks could be extracted from the 3-D model and used to cue the voxelization process during printing, such as medial axes or medial non-intersecting sequence of balls.

The primary function of 3-D cueing is to adjust the way the vector mesh of the 3-D model fits on, or is aligned with, the cubic grid of voxels. This alignment will be used to turn the 3-D model into a solid shape using the multi-layering process of 3-D printing. The fewer voxels there are to work with, the more critical 3-D cueing is, since each voxel necessarily will represent a larger portion of the vector mesh. Thus, the cueing model may also take into account various resolution (layer height) restrictions presented by varying quality 3-D printers and a user setting of layer thickness. Note that model size scaling (scale factors) and voxel size (resolution/layer height) are coupled properties for the illustrated embodiments, since the illustrated embodiments are especially concerned with the number of layers into which the voxel grid is divided upon 3-D printing. Note also that once a resolution is specified for a print, it cannot be changed midway for a specific part of the print job. Thus, in the illustrated embodiments, once a user specifies a voxel size (corresponding to a resolution or layer height) for the print process, that voxel size is then automatically utilized by the illustrated embodiments during creation of a default voxel grid for printing the 3-D model. For a voxel grid having a total layer height of 100 voxels, the illustrated embodiments may use a first cueing set, and for a voxel grid with height of 1000 voxels the illustrated embodiments may use a second cueing set different from the first cueing set.

Advantageously, with the illustrated embodiments, authored 3-D models will be able to be faithfully reproduced in good detail substantially independent of issues that necessarily arise do to scaling of the original scale 3-D model. Additionally, 3-D cueing allows optimization of detail preservation when using a printer having low resolution capabilities.

Various embodiments of a method and apparatus preserving structural integrity of 3-D models when printing at varying scales are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 2:
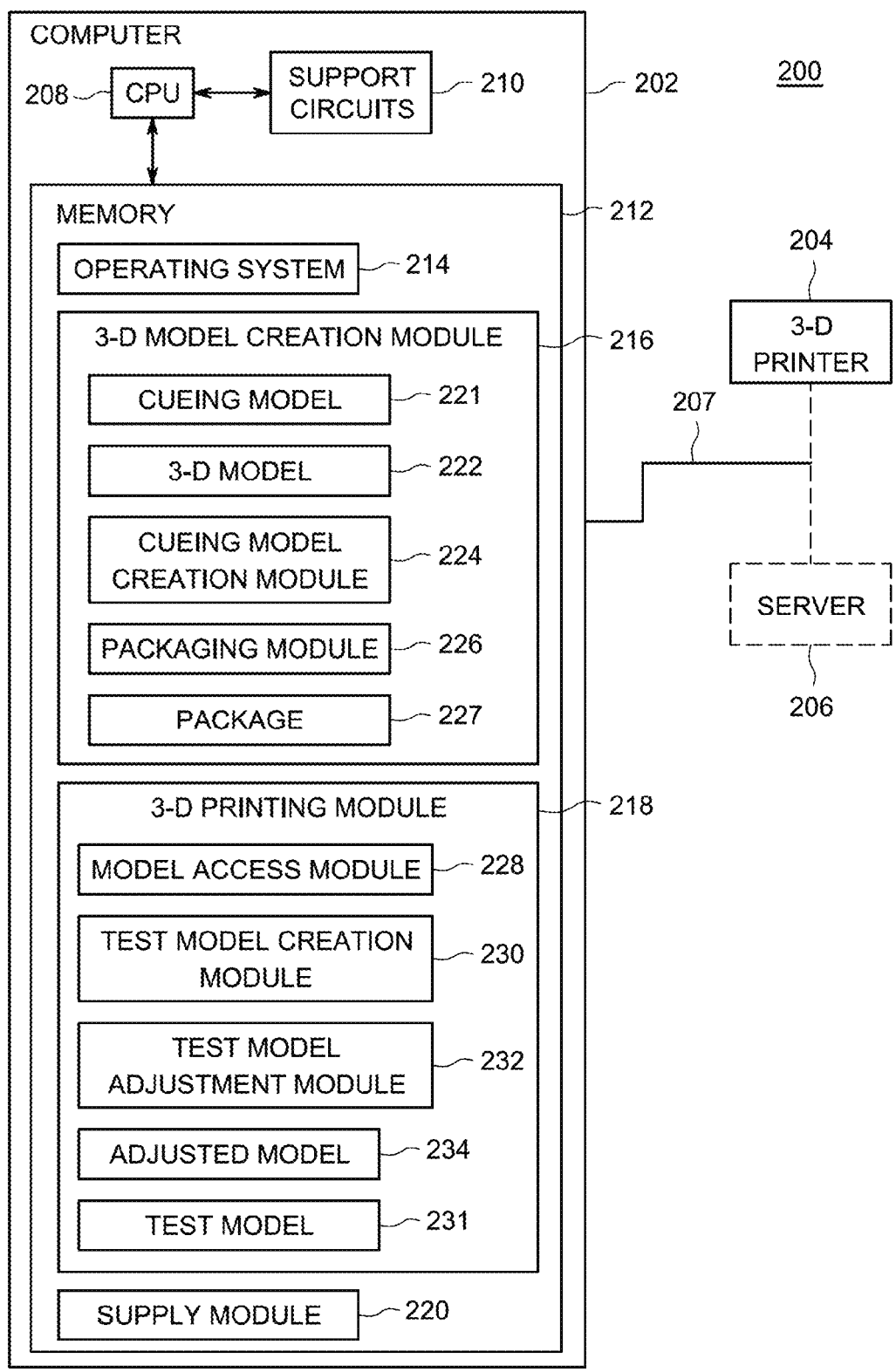
FIG. 2 is a block diagram of an apparatus for preserving structural integrity of 3-D models when printing at varying scales, according to one or more embodiments.

FIG. 2 is a block diagram of an apparatus 200 for preserving structural integrity of 3-D models when printing at varying scales, according to one or more embodiments. The apparatus 200 includes a computer 202, a 3-D printer 204, and optionally, a server 206 communicatively coupled together via a connection 207. Connection 207 connects computer 202 to printer 204 and optional server 206 by wire, cable, fiber optic and/or wireless link facilitated by various types of well-known network elements, such as hubs, switches, routers, and the like. The connection 207 may be an Internet network, or a part of the Intranet using various communications infrastructure, such as Ethernet, Wi-Fi, a personal area network (PAN), a wireless PAN, Bluetooth, Near field communication, and the like. The optional server 206 is a cloud repository storing 3-D models that are available for access by users for printing. 3-D printer 204 includes any one of several well-known and standard 3-D printers, such as the Projet® 1500 available from 3D Systems Inc., the Form 1® available from FormLabs and the MakerBot Replicator™ available from MakerBot® Industries, LLC, etc.

The computer 202 is a type of computing device, such as a desktop computer, a laptop, a tablet computer, or even a Smartphone, and the like. The computer 202 includes a Central Processing Unit (CPU) 208, support circuits 210, and a memory 212. The CPU 208 may include one or more commercially available microprocessors or microcontrollers that facilitate data processing and storage. The various support circuits 210 facilitate the operation of the CPU 208 and include one or more clock circuits, power supplies, cache, input/output circuits, and the like. The memory 212 includes at least one of Read Only Memory (ROM), Random Access Memory (RAM), disk drive storage, optical storage, removable storage and/or the like.

The memory 212 includes an operating system 214, a 3-D model creation module 216, a 3-D printing module 218 and a supply module 220. In some embodiments, the 3-D model creation module 216 is located in a separate computer from the 3-D printing module 218 and supply module 220, which separate computers are operated, respectively, by an author who creates the 3-D cueing model and a user who prints a 3-D model using the created 3-D cueing model. The operating system 214 may include various commercially known operating systems.

The 3-D model creation module 216 is a computer application for allowing an author to create a 3-D cueing model 221 and then package that cueing model 221 with the original scale 3-D model 222 to form a package 227 that includes both of the cueing model 221 and the original scale 3-D model 222. The package 227 is then made available to others via the supply module 220. Supply module 220 may supply the package 227 either directly to the 3-D printer 204 via connection 207 for consumption or indirectly by providing the package 227 to the optional server 206, which server 206 then provides access of the package 227 to one or more of printers 204 for consumption.

The 3-D model creation module 216 initially accesses a data file comprising an original scale 3-D model 222. The 3-D model 222 typically includes a format providing a continuous surface representation for the 3-D model 222, and may include a computer aided design (CAD) file format or a tessellated mesh file format. Typically, it is the author or creator of the original scale 3-D model 222 that is in the best position to create the 3-D cueing model 221 however creation of the 3-D cueing model 221 by the author is not required. The 3-D cueing model 221 can be created by anyone familiar with the design features (structural integrity) of the 3-D model 222. The creator then uses a cueing model creation module 224 to create the 3-D cueing model 221 comprising extracted structural features from the original scale 3-D model 222. The extracted structural features are those determined to be significant to have their relative position, size and shape, preserved in order that any printed resized version of the original scale 3-D model 222 will be a faithful reproduction of the original scale 3-D model 222, that is, the most significant features will be preserved. Further details describing the operation of the cueing model creation module 224 will be described in conjunction with method 400 of FIG. 4 below. Once the 3-D cueing model 221 is created, a packaging module 226 packages the created 3-D cueing model 221 with the original scale 3-D model 222 in order that both models are available in a single package 227 for consumption by 3-D printer 204. Preferably, although not required, both of the cueing model and the original scale 3-D model are of the same file format, such as the STL file format.

The 3-D printing module 218 includes, in some embodiments, a desktop computer application for allowing a user who has accessed the package 227 to faithfully print the 3-D model by using the 3-D cueing model to adjust the 3-D model before printing. The model access module 228 accesses the package 227 that includes a 3-D model 222 that a user desires to print. In an embodiment where the 3-D printing module 218 is not included in computer 202 but in a separate computer, the model access module 228 may access package 227 via server 206 or the package 227 may be input directly to the memory 212 of computer 202 using a portable memory storage device, such as a computer disk or USB thumb drive.

Test model creation module 230 creates a digitized representation of the 3-D model 222 in a format appropriate for printing on the 3-D printer 204, in accordance with standard techniques, such as voxelization of the original 3-D model into a voxel grid. That 3-D digitized representation is called hereinafter a test model 231. Under control of the 3-D printing module 218, the test model 231 is created at a scale desired to be printed by the user, which scale is typically not in one to one correspondence with the original scale 3-D model. In addition the process of discretizing (sometimes referred to as quantizing) the volume of the scaled 3-D model into a voxel grid for printing, will cause the output to loose exact correspondence with the original scale 3-D model. As previously described, when a digitize representation of a 3-D model in a format appropriate for printing is resized as compared to the original scale 3-D model, unfaithful reproduction is often possible The test model adjustment module 232 processes the test model 231 in the same manner that the original scale 3-D model 222 was processed in order to extract structural features of importance for creating the cueing model 221. This processing therefore results in extraction of the same structural features of importance, but this time from the resized original scale 3-D model after digitization into the test model for printing. The test model adjustment module 232 then compares the relative position, size and shape of each of the extracted structural features from the test model 231 to the corresponding extracted feature in the cueing model 221. In the event that differences greater than a predetermined threshold (which threshold is determined as a matter of design choice) are found between the position, size and shape of corresponding extracted structural features of the test model as compared to the cueing model, the voxel grid of the test model is adjusted such that the position, size and shape of the extracted structural features of the test model 321 more favorably compare with the position, size and shape of a corresponding extracted features in the cueing model 221. Adjustment of the position, size and shape of the extracted structural features of the test model so that they correspond substantially with those of the cueing model 221, ensures their aspect ratios are maintained. Such adjustment of the position, size and shape of the extracted structural features preserves the shape/structural integrity of the most significant features of the test model so it can be printed in a manner that faithfully reproduces the most significant features of the original scale 3-D model 222.

In some embodiments, multiple sets of extracted structural features are provided in the cueing model 221, one set for each of a scale or range of scales for which the 3-D model 222 may be printed. For example, a first set of extracted features may be designated for use when printing the original scale 3-D model 222 after being resized (scaled) and sliced into a first range of layers, such as a range from 100 layers to 1000 layers. A second set of extracted features may be designated for use when printing the original scale 3-D model 222 after being resized and sliced into a second range of layers, such as a range from 1001 to 10,000 layers. A third set of extracted features may be designated for use when printing the original scale 3-D model after being resized and sliced into a third range of layers, such as a range from 10,000 to 100,000 layers, etc.

Once the test model is adjusted by the 3-D cueing model 221, the adjusted test model 234 is saved in memory 212 and accessible by the supply module 220, from which it is available for consumption by 3-D printer 204, as previously described.

Modification of desktop 3-D model creation software which runs on computer 202, such as PHOTOSHOP® or SOLIDWORKS®, so as to include creation of a cueing model in accordance with the embodiments disclosed herein, can be achieved by a "plug-in" software addition, as well known, to such 3-D model creation software. Modification of desktop printing software which runs on computer 202 so as to include processing of a cueing model in accordance with the embodiments disclosed herein can be achieved by a "plug-in" software addition such desktop printing software. Additionally, in some embodiments the printing software may be incorporated as firmware in the 3-D printer.

Figure 3:
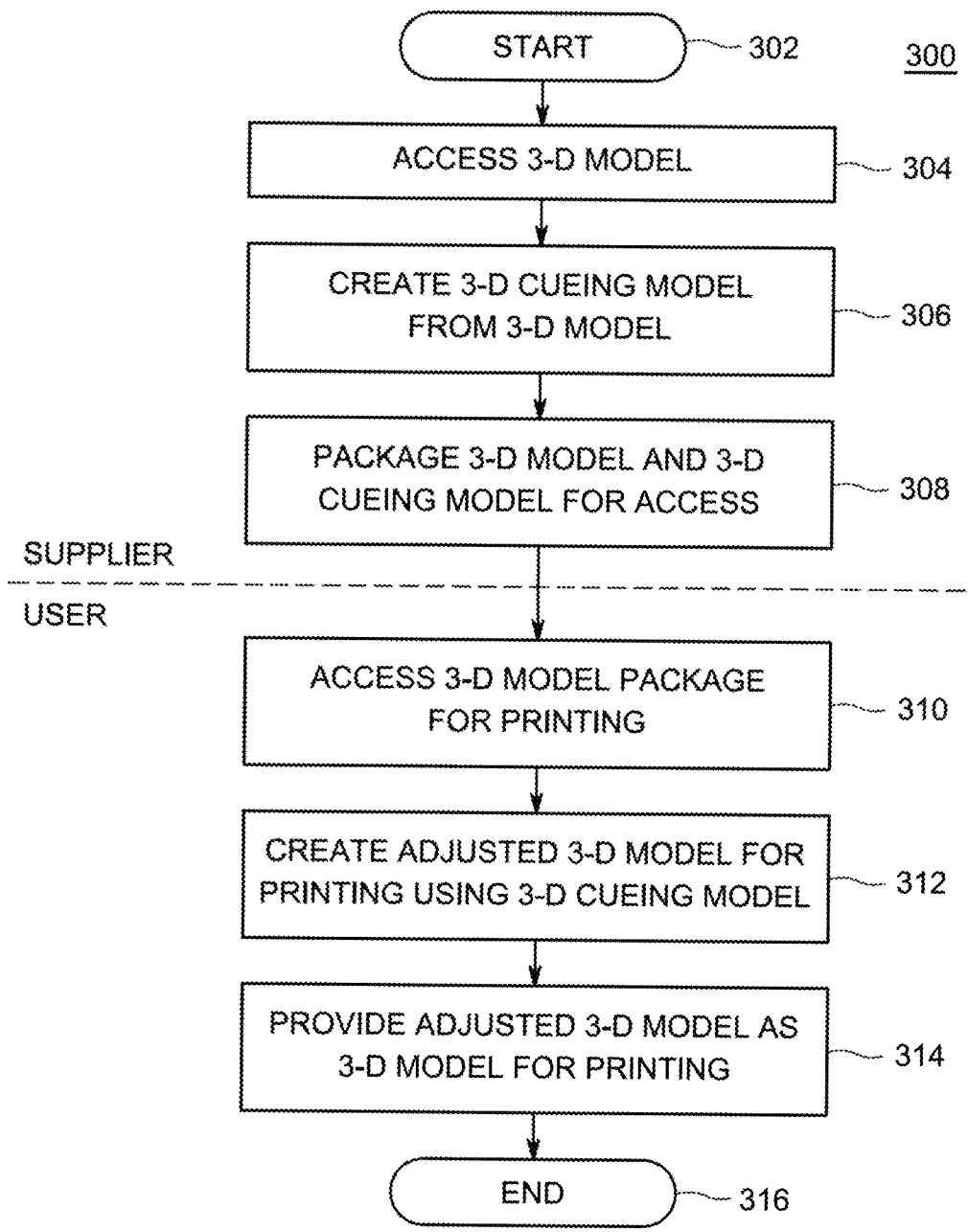
FIG. 3 depicts a flow diagram of a method for preserving structural integrity of 3-D models when printing at varying scales by use of a cueing model, as performed by the apparatus of FIG. 2, according to one or more embodiments.

FIG. 3 depicts a flow diagram of a method 300 for preserving structural integrity of 3-D models when printing at varying scales, as performed by the 3-D model creation module 216 and the 3-D printing module 218 of computer 202 of FIG. 2, according to one or more embodiments. Steps 304 to 308 of method 300 are performed by the 3-D model creation module 216 which supplies an original 3-D model that has been packaged to include a 3-D cueing model. Steps 310 to 314 are performed by the 3-D printing module 218 to faithfully reproduce the original 3-D model by adjustment of a 3-D test model by use of the packaged 3-D cueing model, before printing of the adjusted 3-D test model.

The method 300 begins at step 302 and proceeds to step 304, where the method 300 accesses the original scale 3-D model in order that the 3-D cueing model can be created therefrom. At this stage, the 3-D model typically includes a format providing a continuous surface representation for the 3-D model, and may include a computer aided design (CAD) file format, such as provided by a PHOTOSHOP® or SOLIDWORKS® software application, or a tessellated mesh file format. As previously noted the author or creator of the original scale 3-D model is typically in the best position to create the 3-D cueing model; however creation of the 3-D cueing model by the author is not required and anyone familiar with the design features (structural integrity) of the 3-D model can create the 3-D cueing model.

The method 300 then proceeds to step 306 where the method 300 creates a 3-D cueing model. The method 300 extracts from the 3-D model structural features that are representative of the structural integrity of the 3-D model. Such structural features may include cuboidal blocks and 2-D plates that are internal to the 3-D model. Further details describing the extraction of the structural features from the 3-D model are described in further detail with respect to FIG. 4 below. The position, size and shape of each of the extracted structural features is provided in a list of STL files (as noted above), thereby creating the 3-D cueing model. In some embodiments this information is provided by indicating, with reference to a 0,0,0 point in a standard x,y,z coordinate axes volume, the position of the vertices of the extracted structural features (which may include blocks of cubes) and their size. As also previously noted, this information can be grouped into sets of information's, each set corresponding to a range of sizes in which the 3-D model will be printed after resizing from the original scale 3-D model.

The method 300 proceeds to step 308, where the method 300 packages the created 3-D cueing model with the 3-D model so as to be available for access and used so as to allow as faithful a reproduction of the 3-D model as possible upon printing, irrespective of resizing of the original scale 3-D model, and which takes into account a given resolution capability of the printer.

The method 300 proceeds to step 310, where the method 300 accesses the packaged 3-D model and 3-D cueing model for printing. The method 300 proceeds to step 312, where the method 300 creates an appropriately sized test model for printing from the 3-D model, as described in further detail with respect to FIG. 5, below. The same structural features that were extracted from the original scale model to create the cueing model, are extracted from the test model. The method 300 extracts the structural features from the test model and compares the size, shape and position of the extracted structural features with the feature information in the cueing model. The purpose of the comparing is to determine if adjustment of the test model is necessary before printing. Adjustment is necessary if the aspect ratio of the extracted structural features of the test model are not the same as or within a predetermined threshold (determined as a matter of design choice) of the aspect ratio of the extracted structural features of the original scale 3-D model that comprise the cueing model. Aspect ratios that are the same or within a predetermined threshold, indicate that the structural integrity of the test model has been preserved, thereby indicating that the test model itself can be printed and it will faithfully reproduce the original scale 3-D model upon printing.

The method 300 proceeds to step 314, where the method 300 provides the adjusted test model as the 3-D model for printing. The method 300 then proceeds to step 316 and ends.

Figure 4:
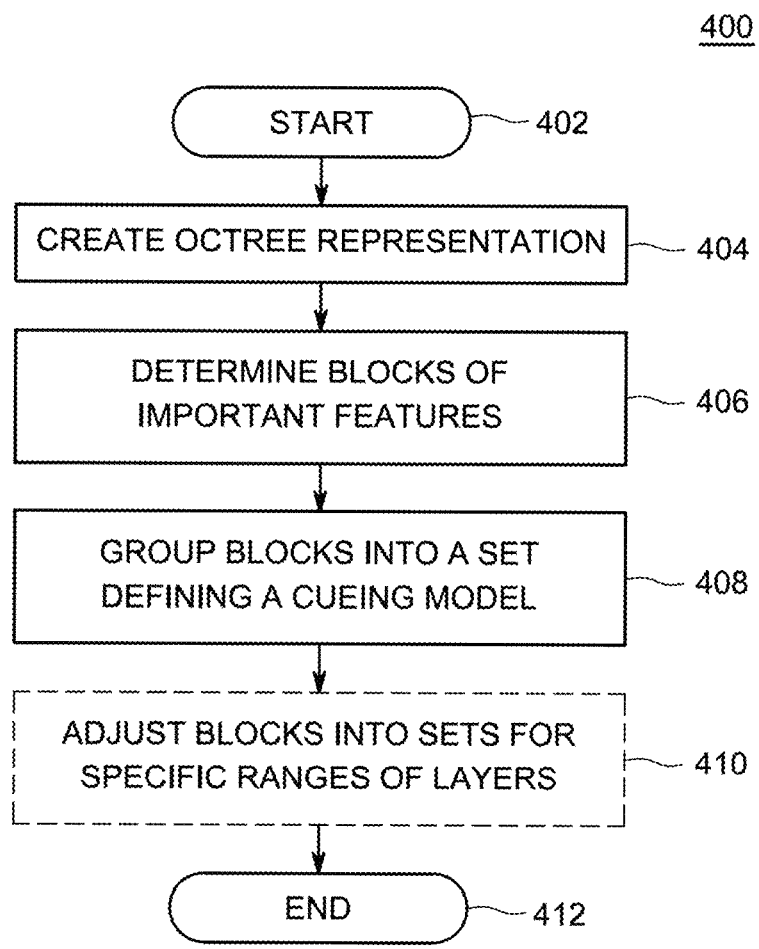
FIG. 4 depicts a flow diagram of a method for creating the cueing model as performed by the cueing model creation module of FIG. 2, according to one or more embodiments.
Figure 6:
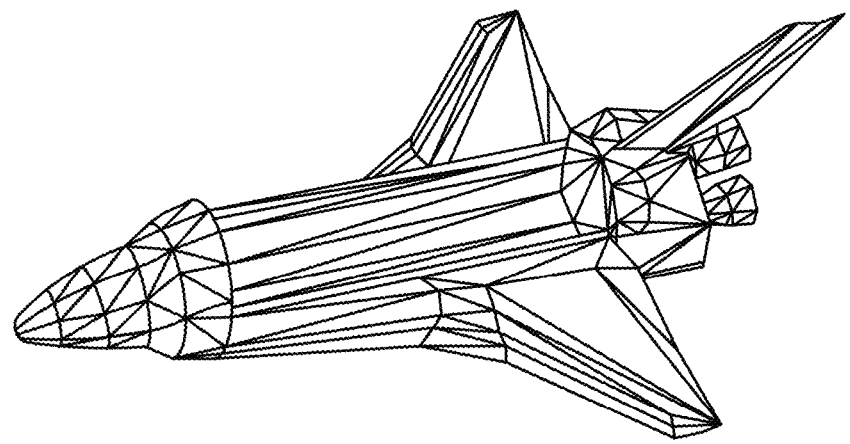
FIG. 6 illustrates a 3-D model of a spaceship in the form of a tessellated mesh, according to one or more embodiments.
Figure 7:
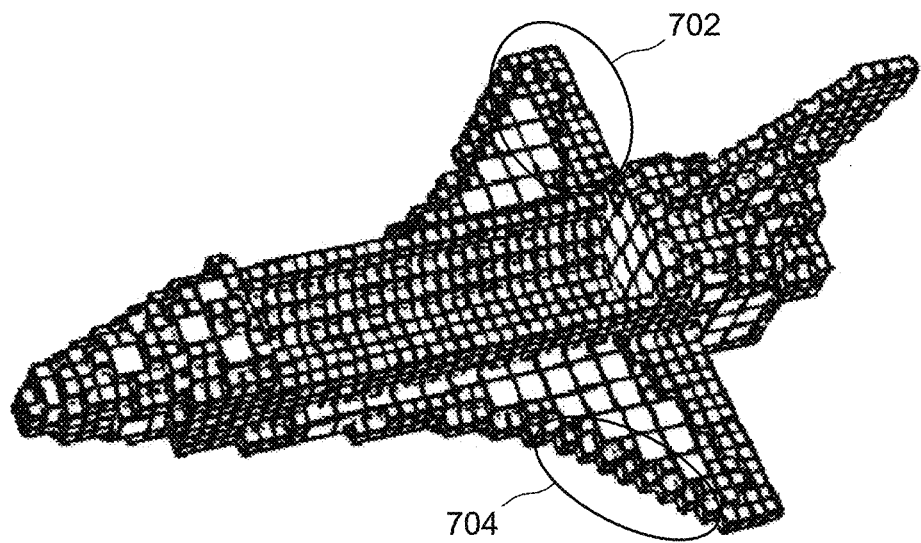
FIG. 7 illustrates a 3-D model of the spaceship of FIG. 6, where the surface of the 3-D model is shown in an octree representation, according to one or more embodiments.
Figure 8:
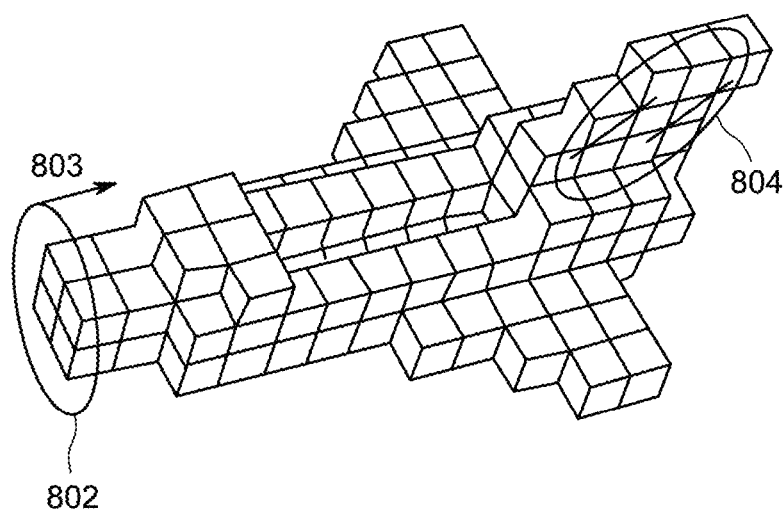
FIG. 8 illustrates a 3-D model of the spaceship of FIG. 6, where the interior of the 3-D model is shown in an octree representation, according to one or more embodiments.

FIG. 4 depicts a flow diagram of a method 400 for creating the cueing model as performed by the cueing model creation module 224 of FIG. 2, according to one or more embodiments. The method 400 extracts structural features from the original 3-D model and then provides the position, size and shape of the extracted structural features as the 3-D cueing model. The method 400 begins at step 402 and proceeds to step 404, where the method 400 "space partitions" the 3-D model into cubes by converting the 3-D model into an octree representation of the volume of the 3-D model. The original 3-D model typically includes a surface representation in the form of a tessellated mesh. FIG. 6 illustrates a top view of a 3-D model of two concentrically positioned toruses. A first torus 602 concentrically surrounds a second torus 604. Toruses 602 and 604 are each illustrated in the form of a tessellated mesh, where the surface of each torus is represented by a plurality of adjacently connected polygons; in this case, squares (although other polygonal shapes can be use, such as triangles, tetrahedrons or octagons). FIG. 7 illustrates a 3-D model of the toruses of FIG. 6, where the surface of the 3-D model is shown in an octree representation. FIG. 8 illustrates the 3-D model of the toruses 602 and 604 of FIG. 6, where the interior of the 3-D model is shown in an octree representation. As known, an octree is a tree data structure in which each internal node has exactly eight children. Octrees are most often used to partition a three dimensional space by recursively subdividing the space it into eight octants. The octree representation is created using known techniques to identify neighboring nodes (cubes) at the same depth in order to create blocks of cubes. The larger the block the more volume it represents, and thus large blocks represent portions of structural significance to the 3-D model. Such large blocks are hereinafter also referred to as "structural features" or "feature blocks" of the 3-D model. These structural features are significant because their size, position and shape within the confines of the model must be retained after resizing and slicing of the 3-D model in preparation for printing, in order to faithfully reproduce the resized 3-D model when printing. In FIG. 8 illustrates horizontally aligned blocks 806 and 810, and vertically aligned blocks 808 and 812, and blocks 814 and 816 that are diagonally aligned.

The method 400 proceeds to step 406, where the method 400 determines the size, position and shape of blocks identified to be significant structural features. The method 400 uses a combinatorial optimization process to identify a collection of neighboring nodes so as to form larger blocks (such optimization process sometimes referred to as the "knapsack problem"). FIG. 7 illustrates combinatorial optimization where a block 702 is formed by identification of nodes near the surface of the 3-D model that are aligned with an axis of the model, and a block 704 is formed by identification of nodes near the surface of the 3-D model that are arranged diagonal to an axis of the model. Thus, blocks 702 in 704 represent significant structural features in the model, whose relative size, position and shape within the model, and thus with respect to each other, needs to be retained after resizing, in order that the resized model can be a faithful reproduction of the original 3-D model. In FIG. 8, a large block is formed by a collection of nodes having a cross-section of four nodes as indicated by 802, which block extends in the direction of arrow 803 for basically the full length of the spaceship model. Block 802 is aligned with an axis of the model. A block 804 also indicates a large collection of nodes, which collection has a longitudinal axis that is arranged diagonal to an axis of the model. Blocks 802 and 804 are representative of just two extracted structural features whose relative size, position and shape within the model, and thus with respect to each other, needs to be retained after resizing in order that this resized model can be a faithful reproduction of the original 3-D model.

In order to automatically create and identify the position of the axially aligned cuboidal blocks, we specify the below constraints in the combinatorial optimization process for each block:

1. All octree nodes $N_i \epsilon (N_1 N_2 \ldots N_k)\xi$, with coordinates $(x_i \ y_i \ z_i)$ have the property:

$X_{min} <= x_i <= X_{max}$ $Y_{min} <= y_i <= Y_{max}$ $Z_{min} <= z_i <= Z_{max}$ 2. Also for any $x_j$, $y_j$, $z_j$ given the property $X_{min} <= x_j <= X_{max}$, $Y_{min} <= y_j <= Y_{max}$, $Z_{min} <= z_j <= Z_{max}$ There exists a node $N_j \epsilon (N_1 N_2 \ldots N_k)\xi$, such that $N_j$ has the coordinates $x_j$, $y_j$, $z_j$.

In order to automatically create and identify the position of the diagonally aligned cuboidal blocks we specify the below constraints in the combinatorial optimization process for each block:

1. We are able to construct 4 line segments in 3-D space parallel to each other.

2. Each line segment is specified by:—

Points $P_1$ and $P_2$ represent points in 3-D integer space with coordinates $(x_1 \ y_1 \ z_1)$ and $(x_2 \ y_2 \ z_2)$ $P = (1-t)*P_1 + t \ P_2$ for $0 \leq t \leq 1$ 3. Any of these lines will be parallel if given the endpoints $P_1$ and $P_2$ for line1, and endpoints $P_3$ and $P_4$ for line2 $(P_2-P_1) \cdot (P_4-P_3) = 0$ where each point is represented by a vector in 3-D space joining the origin to the point.

4. In addition, the endpoints for each of these 4 lines must be coplanar, to satisfy the condition of being a plate.

5. For any integer co-ordinates $x_j$, $y_j$, $z_j$ that exists in this volume there exists a node $N_j \epsilon (N_1 N_2 \ldots N_k)\xi$, such that $N_j$ has the coordinates $x_j$, $y_j$, $z_j$.

Once the method 400 automatically identifies the size, position and shape of the axially aligned and diagonally aligned cuboidal blocks of significance, the method 400 proceeds to step 408, where the method 400 collects the size, position and shape of the identified blocks and groups them into a listing, hereinafter referred to as the 3-D cueing model. The amount of blocks collected to form the 3-D cueing model is a matter of design choice and may include blocks formed of nodes having two or three successively deeper depths in the octree. The 3-D cueing model is stored as a sequential list of STL files that describe the size, shape and position of the extracted blocks (structural features of importance). In the illustrated embodiments, each block has 6 faces and is represented by 12 triangles, with all of the triangles representing the size, shape and position of all of the extracted blocks, being listed in an STL file having a binary format. Each triangle in the STL file also has a redundant 16 bit attribute, which is used to store the index of the feature block to which it belongs. An exemplary STL listing is shown below, depicting size and shape details for three triangles out of 2,316 triangles used to describe the size and shape of a 3-D object.

```
solid vcg
  facet normal 9.639959e-001 6.318346e-002 2.583015e-001
    outer loop
      vertex 1.594219e+000 1.628449e+000 3.154734e-001
      vertex 1.583525e+000 1.791607e+000 3.154734e-001
      vertex 1.550318e+000 1.787236e+000 4.404734e-001
    endloop
  endfacet
  facet normal 9.639959e-001 6.318317e-002 2.583018e-001
    outer loop
      vertex 1.550318e+000 1.787236e+000 4.404734e-001
      vertex 1.560726e+000 1.628449e+000 4.404734e-001
      vertex 1.594219e+000 1.628449e+000 3.154734e-001
    endloop
  Endfacet
  .
  .
  .
  facet normal 9.639959e-001 -6.318346e-002...
    outer loop
      vertex 2.803535e+000 1.628449e+000 4.694240e-001
      vertex 2.782496e+000 1.307444e+000 4.694240e-001
      vertex 2.717162e+000 1.316046e+000 2.234924e-001
    endloop
  endfacet
endsolid vcg
```

Figure 12A:
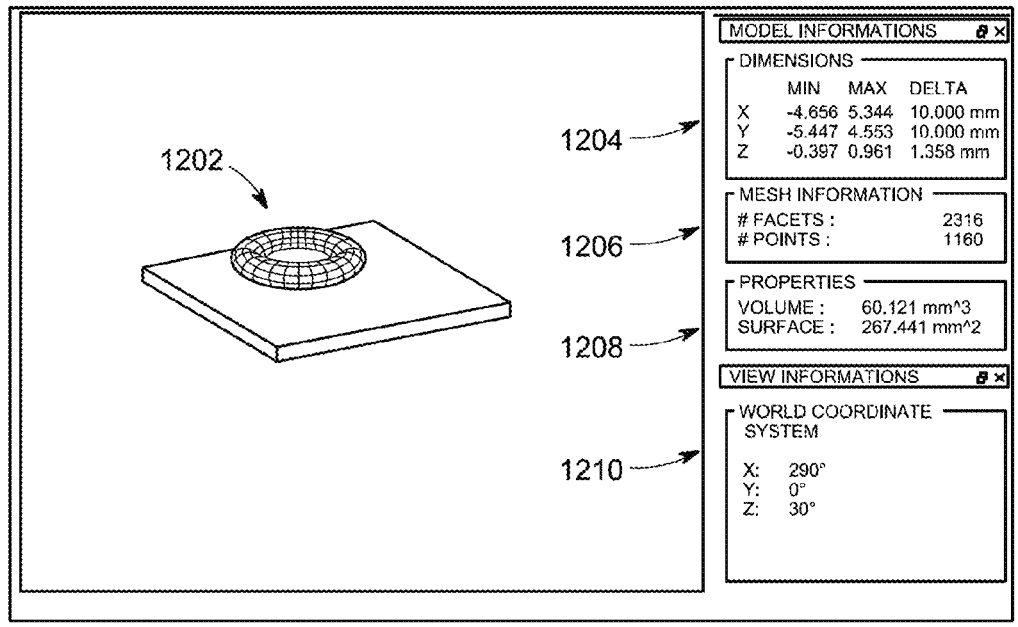
FIG. 12A illustrates a graphical representation of an STL file for an original 3-D model and 12B illustrates a graphical representation of an STL file for a cueing model original 3-D model.
Figure 12B:
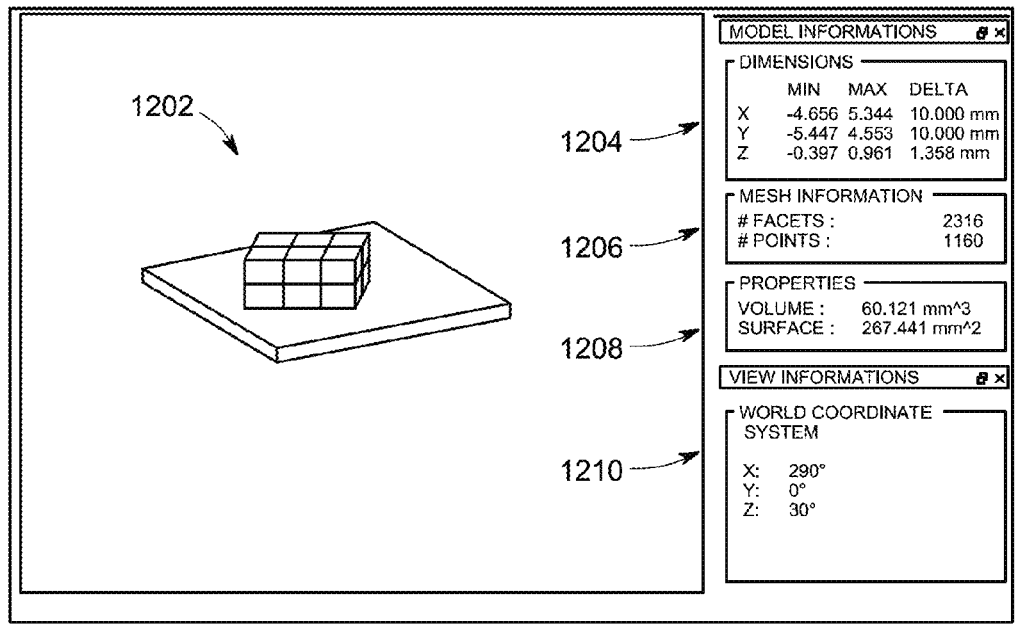

FIGS. 12A and 12B illustrate additional details of the STL file format, where FIG. 12A depicts and STL file for an original 3-D model such as shown in FIG. 1A, and FIG. 12B illustrates an STL file for a significant feature block in a cueing model. In these Figures, 1202 depicts the shape of the 3-D object defined by the STL file, 1204 depicts the Dimensions of the 3-D object defined by the STL file, 1206 depicts the Mesh Information of the 3-D object defined by the STL file, 1208 depicts the Volume and Surface Area of the 3-D object defined by the STL file and 1210 depicts the World View Coordinate System of the 3-D object defined by the STL file.

Additionally, as noted above, the set of blocks defining the cueing model at step 408 is designated for use when printing the 3-D model using one or more specified ranges of layers (the number of layers being determined by the change in scale from the size of the original 3-D model to the size of 3-D model to be printed in combination with the resolution capabilities of the 3-D printer (that is, the minimum layer thickness). For example, in one embodiment the cueing model developed at step 408 may be identified for use when printing at any scale, that is, a range from one to infinity. In another embodiment, the author or creator of the 3-D model determines specific sets of blocks as a cueing model corresponding to a specific range of scale factors (corresponding to a specified range of layers to be used to print the 3-D model, such 100 to 1000 layers, 1001 to 10,000 layers, etc.). The range of layers (corresponding to a range of scale factors/size ranges) for which a specified cueing STL file is to applicable, is stored in the cueing model file as an 80 byte header using a pair of 32 bit unsigned integers, thereby defining the minimum and maximum layer values of the range of layers for which that particular cueing model is applicable.

Thus, in some embodiments the method 400 optionally proceeds to step 410. Since the 3-D cueing model is typically being created under the direction of the creator of the original 3-D model, at optional step 410 the method 400 develops different sets of blocks that are designated for use during 3-D printing at different predefined conditions of scale difference from the original 3-D model in relation to the layer height to be used by the printer. For example, as a result of step 410, a first set of extracted structural features may be designated for use when printing the original 3-D model after being resized (scaled) and sliced into a number of layers anywhere within a range of 100 layers to 1000 layers, a second set of extracted features may be designated for use when printing the original 3-D model after being resized and sliced into a number of layers within a range of 1001 to 10,000 layers, and a third set of extracted features may be designated for use when printing the original 3-D model after being resized and sliced into a number of layers within a range of 10,000 to 100,000 layers, etc.

Figure 9A:
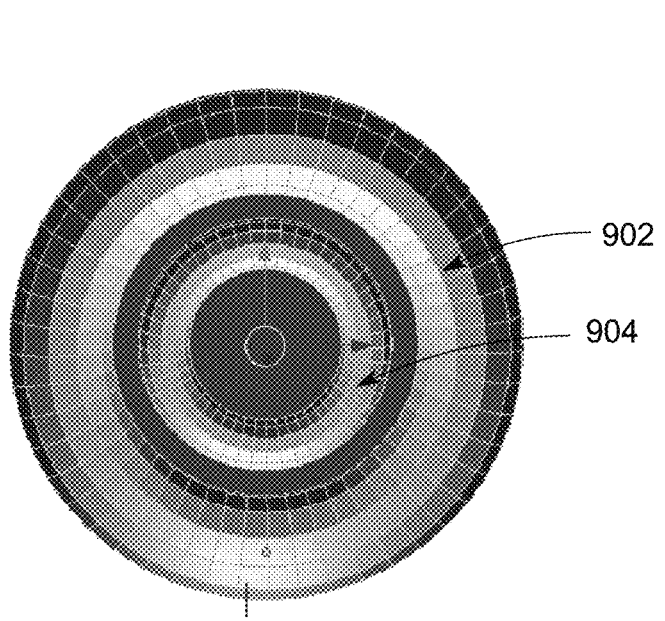
FIGS. 9A, 9B, 9C and 9D illustrate adjustment of a feature in a cueing model as performed by a step of the method of FIG. 4, according to one or more embodiments.
Figure 9B:
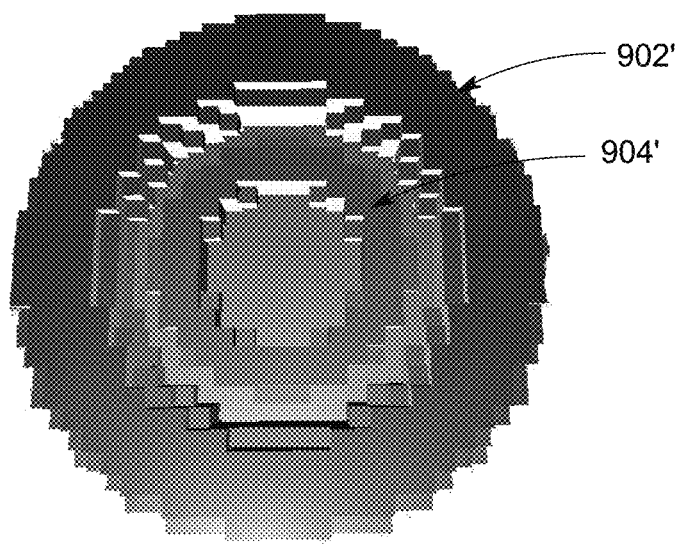
Figure 9C:
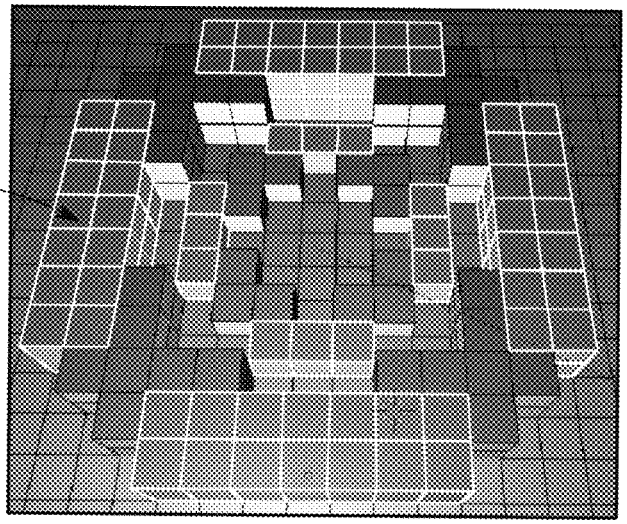
Figure 9D:
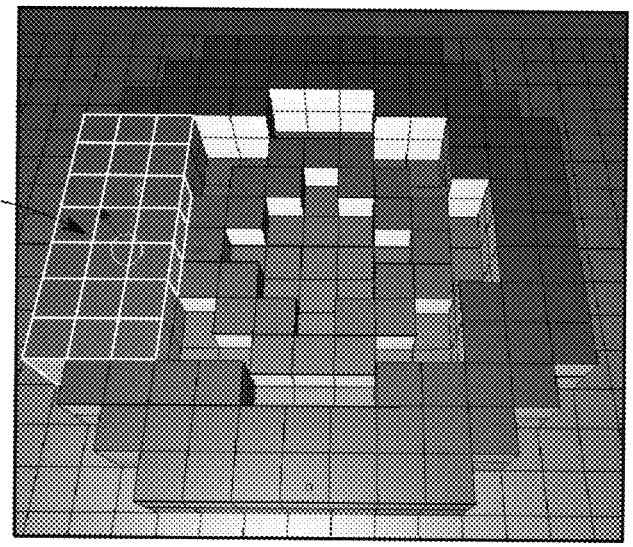

The process used by the creator for determining the need for and then creation of the multiple sets of cueing models, is described next. For determining each set of structural features, the creator manually scales and voxelizes the original 3-D model to one of a plurality of possible user selected conditions that result in printing of the 3-D model at a given layer height (as determined, for example, by the resolution capabilities of a particular 3D printer to be used to print the 3D model). The creator then converts the scaled 3-D model into an octree representation and extracts the same significant blocks (structural features) from the octree representation in the same manner as was described above for extracting structural features from the original 3-D model. In this regard, FIGS. 9A, 9B, 9C and 9D illustrate adjustment of one such significant block in a cueing model. FIG. 9A illustrates a top view of an original scale 3-D model 900 comprising two concentric toruses 902 and 904 (similar to FIG. 1A). FIG. 9B illustrates two concentric toruses 902' and 904', which are the concentric toruses 902 and 904 of FIG. 9A after voxelization and slicing into five (5) layers for printing in accordance with well-known and standard techniques. Because there is no resizing, the FIG. 9B representation is basically a faithful voxel grid representation of the original scale 3-D model 900. FIG. 9C illustrates by highlighting, significant blocks that are extracted from an octree representation 905 of the 3D model after it has been resized according to one of a plurality of possible customer selections. The significant blocks are extracted from the resized model using the same techniques as described above for step 406. Block 906 of octree representation 905 is representative of one such significant block in the octree representation. Next, that octree representation of the blocks is re-scaled back to the size of the original 3-D model, and the size, position and shape of those blocks are compared to the size, position and shape of ones extracted from the originally sized 3-D model. If their size, position and shape match closely, then faithful reproduction of the resized 3-D model is more assured. However, at locations in the re-scaled octree representation of the model the where the size, position and shape of one or more significant blocks do not closely match, it is likely that there will be visible unfaithful reproduction of the printed resized 3-D model. Thus, in accordance with this optional step 410 the creator can modify the size, position and shape of the blocks included in the cueing model feature set for that scale or a range of scales, as necessary, so that when the modified blocks are used as the cueing model during printing at that specified scale or within a specified range of layers, faithful reproduction results. FIG. 9D graphically illustrates via block 906' how the size, shape and position of significant block 906 of FIG. 9C is adjusted, by addition and removal, as appropriate, of sub-blocks, according to this method. Note that block 906 of FIG. 9C is illustrated to be two cubes wide, while block 906' of FIG. 9D has been adjusted by the creator to be three cubes wide. The adjustment is the result of the creator of the cueing model modifying block 906 to be block 906' in order to provide a correct cueing model for use during printing at the specified scale or within a specified range of layers that FIG. 9C is representative.

Thus, at step 410, the method 400 creates scaled and voxelized versions of the accessed 3-D model, and then resizes the output version back up to an original size of the accessed model, in order to determine if any adjustments are needed to the size, shape and position of the features included in the 3-D cueing model. The method 400 also allows for scaling and voxelization at more than one value and iterative comparison to see if the voxelization process progressively causes a loss in detail at different layer heights. By analyzing the loss in detail at different layer heights, it is possible for the creator to optimize the cueing model for a particular range of scale and voxelization values.

More specifically, after resizing of the created volumetric representation back to original size, the method 400 extracts the structural features again from the resized volumetric representation, and compares the extracted structural features with the feature information obtained from the original 3-D model before resizing and voxelization, in order to determine how iterative changes in the size, position and shape of the extracted structural features that form the cueing model affect the faithful reproduction of the 3-D model upon printing. Upon determination of optimal changes to the size, position and shape of the extracted structural features in order to have faithful layer by layer reproduction of the model within a range of scale factors, the method 400 includes those determined optimal changes in a corresponding set of structural features of the cueing model identified for use when printing the model at a size within a given scale range.

Figure 5:
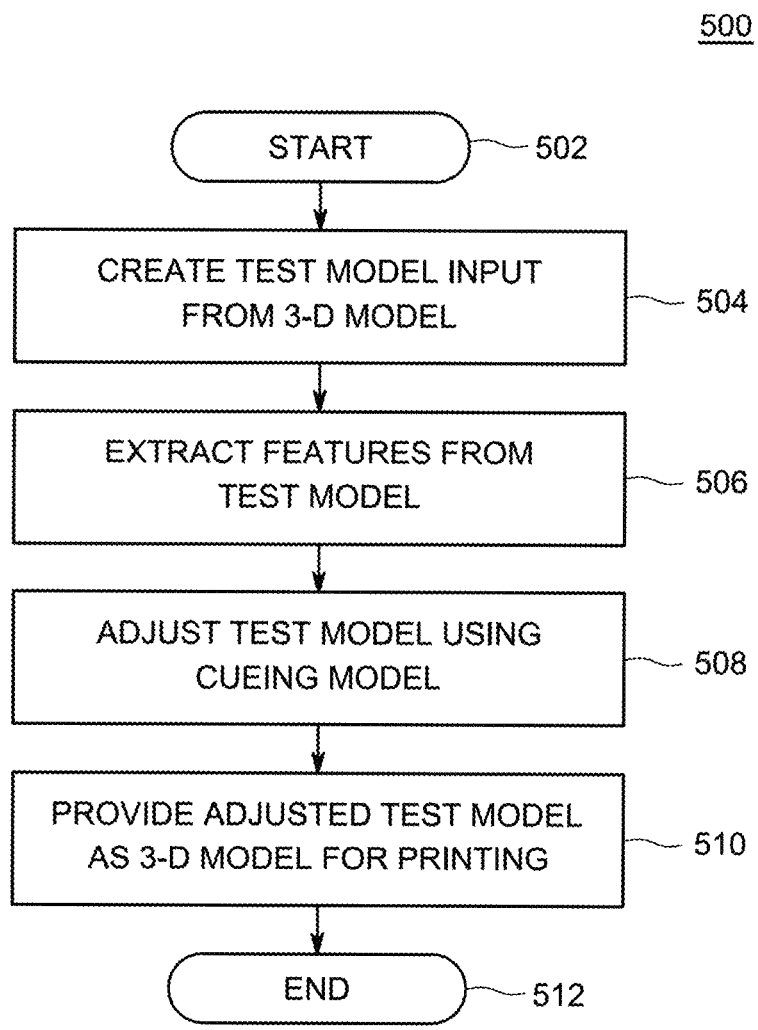
FIG. 5 depicts a flow diagram of a method for using the cueing model to preserve the structural integrity of the 3-D model when printing, as performed by the test model creation module and test model adjustment module of FIG. 2, according to one or more embodiments.

FIG. 5 depicts a flow diagram of a method 500 for using the cueing model to preserve the structural integrity of the 3-D model when printing after being re-scaled, as performed by the test model creation module 230 and test model adjustment module 232 of FIG. 2, according to one or more embodiments. The method 500 scales the original 3-D model to a desired size for printing so as to create a 3-D test model, extracts the significant structural features from the test model, and then checks that upon layer by layer printing, those significant structural features maintain, within a predetermined threshold level, their size, shape and position as compared with the size, shape and position of corresponding structural features shown in the cueing model.

More specifically, method 500 checks for "grid fitting" (i.e., alignment), "consistent plate cross-section area" (i.e., weight) and "consistent inter-plate separation" (i.e., spacing) of the significant structural features of test model during printing. Any differences greater than a predetermined threshold level, set as a matter of design choice in method 500, requires adjustment. Such adjustment is achieved by shifting at least a portion of a 2-D layer of the voxel grid during printing in order to ensure as accurately as possible a constant position, weight and spacing for the extracted structural features.

The method 500 begins at step 502 and proceeds to step 504 where the method 500 converts a continuous geometric representation of the 3-D model from the accessed package into a volume representation format appropriate for a given printer and scaled to a desired size for printing. Conversion may be by 3-D voxelization into a voxel grid. Traditional voxelization is accomplished using standard algorithms, such as Kaufman's Algorithm and Mokrzycki's discretization algorithm. Once a voxel grid of the resized 3-D model is created, it is referred to as a "test model" which in effect, is a preview of the input data to be consumed by the printer in order to print the 3-D model at the desired size.

The method 500 proceeds to step 506, where the method 500 uses the algorithms described above for identifying the size, position and shape of the significant structural features when making the cueing model, but this time the method 500 applies the algorithms to the test model data. This results in identification of the size, position and shape of structural features that correspond to the extracted structural features in the cueing model. The method 500 uses these identified structural features from the test model for optimizing "grid fitting" (alignment), "consistent plate cross-section area" (weight) and "consistent inter-plate separation" (spacing) for preparing the 3-D model information for printing.

Figure 10:
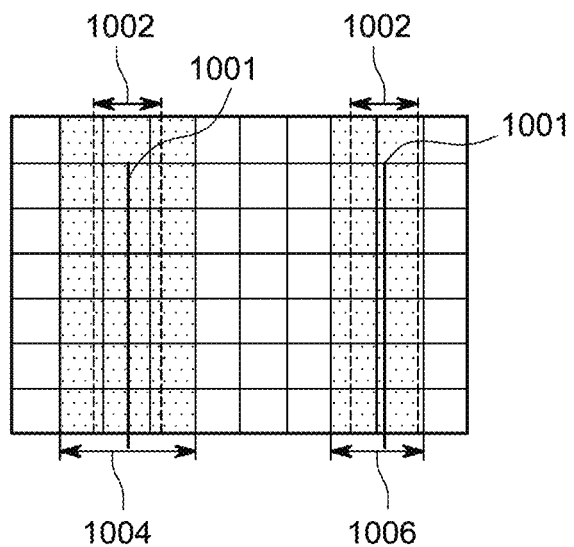
FIG. 10 is a graphical representation for optimizing alignment of extracted structural features during printing of the voxel grid, according to one or more embodiments.

The method 500 proceeds to step 508, where the method 500 adjusts the test model during printing, using the cueing model to help ensure minimum loss in detail in the resized and printed 3-D model. More specifically, the method 500 performs "grid fitting" (alignment) of the test model during printing by shifting at least a portion of a 2-D layer of the voxel grid during printing in order to ensure as accurately as possible a constant cross-section for the extracted structural features. This is illustrated in FIG. 10, wherein the central axis of an extracted feature (such as the leading edge of the wing of the spaceship shown in FIG. 7 as feature block 704) having an actual cross-section of just less than two voxels. FIG. 10 is a voxel grid presentation illustrating a path of a print head or other device for printing a given layer of a 3D model in a grid-based manner. As illustrated therein, a central axis 1001 of an extracted feature (like feature block 704) has a cross-section 1002 that is just less than two voxels wide. Note, however, when the central axis 1001 of the extracted feature is aligned with the grid-based path movement of the print head, the resultant cross-section 1004 of that feature becomes three voxels wide. If however, the central axis 1001 of the extracted feature is adjusted slightly to the right, so as be aligned with the voxel grid as shown in the right half of FIG. 10, the resultant cross-section 1006 of that feature becomes two voxels wide, which more closely matches the actual cross-section 1002. Thus, in order to provide "grid fitting" (alignment) optimization for each layer of the test model before printing, each slice or layer of the voxel grid that includes a feature which could have cross-section representation in that layer improved by shifting its alignment with the voxel grid, is shifted during printing so as to result in a more faithful reproduction of the extracted feature, and hence, the 3-D model.

Step 508 also uses the extracted structural features from the test model for optimizing the weight of the extracted structural features at each layer, by attempting to ensure that the structural features have "consistent plate cross-section area". Thus, step 508 also looks at the feature blocks of the cueing model, and for scenarios where due to the layering process of 3-D printing, a feature block of the cueing model has been split into a set of smaller plates in one or more layers of the plurality of layers in the test model. In those situations, the method 500 introduces voxels into those layers such that the original cross section area of the feature can be gained back in those layers in the test model upon printing.

Similarly there can exist an inverse scenario where multiple feature blocks of the cueing model are depicted as being jointed together into a larger feature blocks in the test model, in which case step 508 modifies the test model voxel grid to remove the voxels which constitute the difference between the two feature blocks, thereby ensuring that feature blocks of the test model do not have larger widths.

The method 500 also matches the spacing between any two extracted structural features of the test model with the spacing between any two structural features listed in the cueing model, in order to identify locations where the test model contains pairs of structural features which do not align similarly to pairs of structural features in the cueing model. In essence, due to the voxelization process, the angle between any two feature blocks in the test model may be modified. In order to reverse this behavior, the method 500 either adds or removes voxels from the voxel grid during printing, so that the angle between the feature blocks extracted from the test model becomes same as the corresponding feature blocks in the cueing model. To decide whether to add or remove voxels, other parameters of the two plates are relied upon, i.e., the grid alignment parameter and the consistency of their cross sectional area parameter.

Figure 11A:
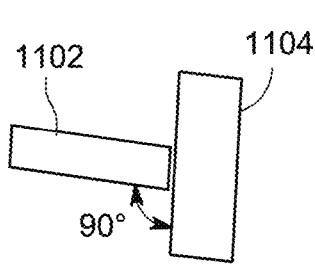
FIGS. 11A-11C are a graphical representation for optimizing spacing between structural features during printing of the voxel grid, according to one or more embodiments.
Figure 11B:
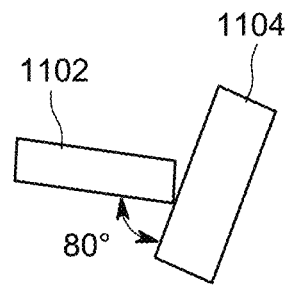
Figure 11C:
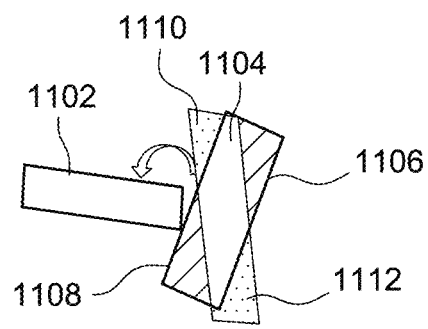

For example, referring to FIG. 11A, feature blocks 1102 and 1104 have faces which were originally perpendicular to each other in the cueing model, but are at an 80 degree angle in the test model, as shown in FIG. 11B. FIG. 11C shows how voxels are removed in areas 1106 and 1108 above and below the central plane of the test model block 1204 and voxels are added in areas 1110 and 1112 above and below the central plane to make the two feature blocks 1102 and 1104 again perpendicular to each other. Although FIGS. 11A, 11B and 11C illustrate adjustment of voxel data to maintain a perpendicular relationship between corresponding significant structural feature blocks, adjustment to maintain other angular relationships, such as a parallel relationship, can be accomplished in a similar manner. The method 500 then proceeds to step 510, where the adjusted test model from step 508 is applied for printing, for example by application to the input of a 3-D printer or by transmission to a 3-D printing service. The method 500 then proceeds to step 512 and ends.

Thus, the described method and apparatus can be used for authoring 3-D models which can be faithfully printed after re-scaling to either small or large sizes, as well as on low cost or low resolution 3-D printers.

Example Description

A user who desires to print a 3-D model, access an STL file of the 3-D model, along with, in accordance with the embodiments described herein, a 3-D cueing model that is packaged with the 3-D model. As described above, the 3-D model creation module 216 allows a creator of an original 3-D model to create a 3-D cueing model and then package that cueing model with the original scale 3-D model.

Figure 13:
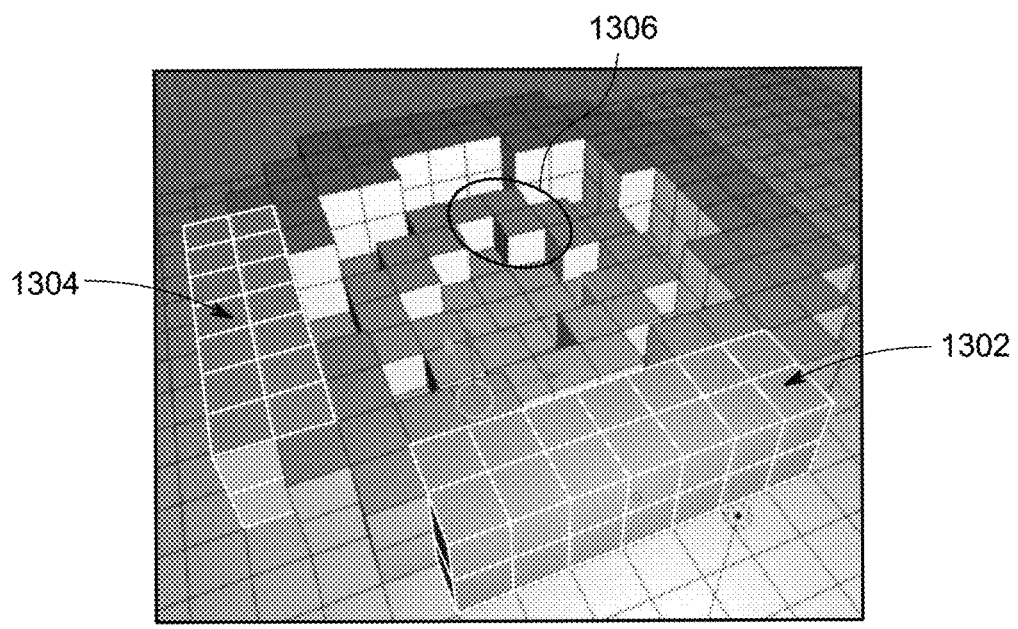
FIGS. 13-16 are graphical representations of an example illustrating creation and use of a 3-D cueing model according to one embodiment of the invention.

The creator uses a cueing model creation module 224 to create the 3-D cueing model comprising extracted structural features from the original scale 3-D model 222. The extracted structural features are those determined to be significant to have their relative position, size and shape, preserved in order that any printed resized version of the original scale 3-D model 222 will be a faithful reproduction of the original scale 3-D model 222, that is, the most significant features will be preserved. Extraction is in accordance with the prior description for FIGS. 6, 7, and 8, however, in the following FIGS. 13-16, the structural features are extracted from an octree representation of a 3-D model having the shape of two concentric toruses. FIG. 13 illustrates extracted structural features 1302 and 1302 as part of a first set of extracted structural features to be used for a 3-D cueing model. Extracted structural features 1302 and 1302 are axially aligned with the axes of the octree representation. By considering the symmetry of the 3-D model, it is clear that two additional structural features diagonally opposed to 1302 and 1302 would also be in this first set. 1306 illustrates one portion of a set of extracted structural features that are diagonally oriented with respect to the octree representation of the 3-D model. By considering the symmetry of the 3-D model, it is clear that three additional structural features would also be in this first set.

Figure 14:
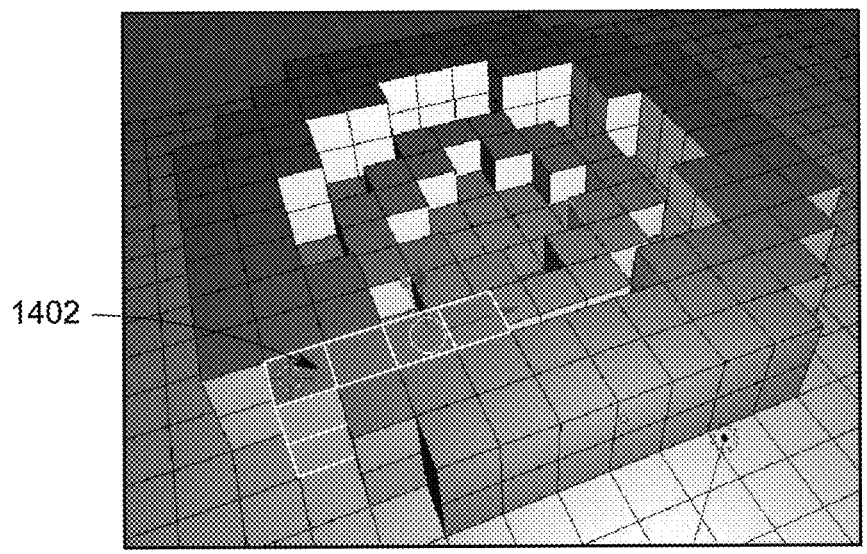

FIG. 14 illustrates extracted structural feature 1402 as part of a second set of extracted structural features to be used for the 3-D cueing model. Extracted structural feature 1402 is axially aligned with the axes of the octree representation. By considering the symmetry of the 3-D model, it is clear that four additional structural features are similarly positioned within the 3-D model and would also be in this second set.

Figure 15:
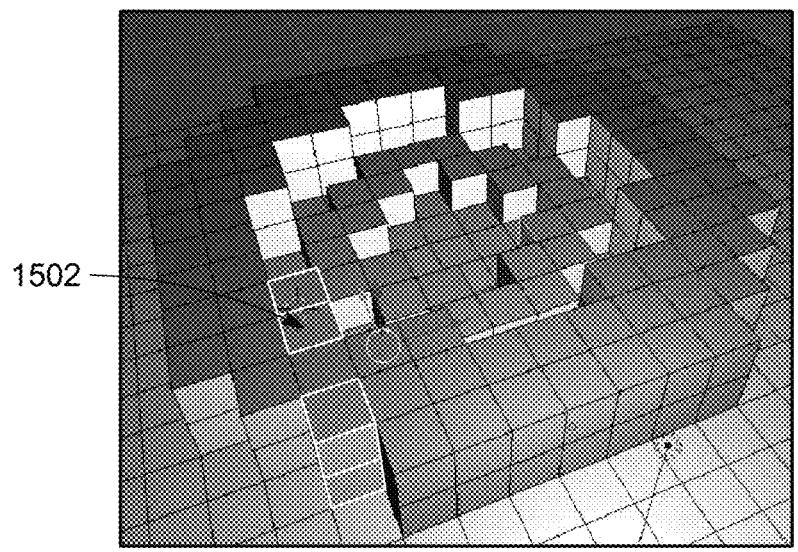

FIG. 15 illustrates extracted structural feature 1502 as part of a third set of extracted structural features to be used for the 3-D cueing model. Extracted structural feature 1502 is axially aligned with the axes of the octree representation. Note, structural feature 1502 is split across the feature block of FIG. 13. By considering the symmetry of the 3-D model, it is clear that four additional structural features are similarly positioned within the 3-D model and would also be in this third set.

Figure 16:
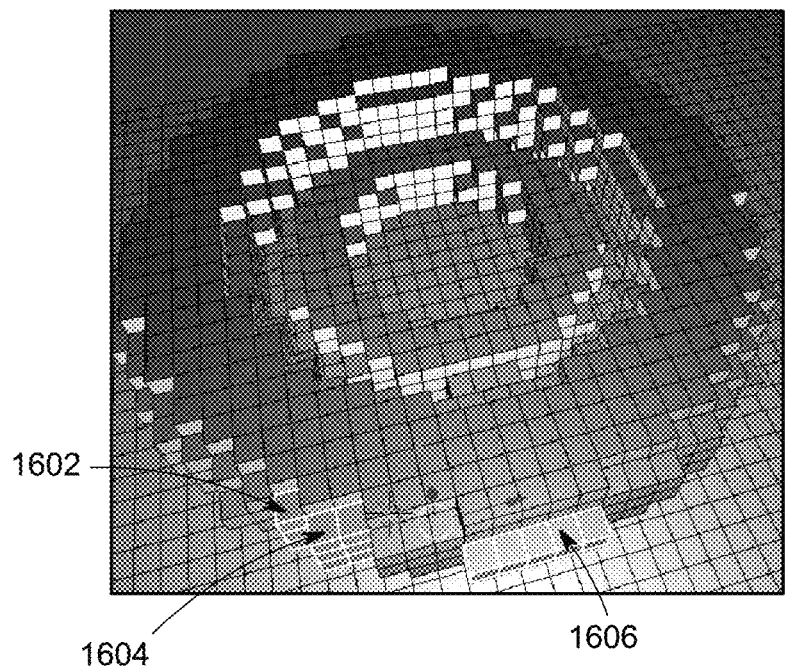

It is noted that the extracted structural features illustrated in FIGS. 13-15 are "surface" features, extraction of structural features from deeper within the octree representation is also desirable. In this regard, FIG. 16 illustrates extracted structural features 1602$m$ 1604 and 1606 as part of a fourth set of extracted structural features to be used for the 3-D cueing model. By considering the symmetry of the 3-D model, it is clear that many additional structural features are similarly positioned within the 3-D model and can also be used to form this fourth set.

All of the above described structural features grouped into a plurality of STL files as a cueing model, which cueing model is packaged with the STL file of the 3-D model for presentation to a user. However, as noted above, embodiments of the invention optionally adjust the cueing model in order to help ensure that the relative position, size and shape of the significant features of the 3-D cueing model maintain their relative correspondence in spite of a re-sizing of the original 3-D model prior to printing. Thus, the creator of the cueing model scales the original 3-D model to a 3-D model re-sized for printing. For example, the creator may re-size the original 3-D model to $\frac{1}{10}^{th}$ the size (using known digital processing techniques), and then extract significant features as describe above, from the $\frac{1}{10}^{th}$ re-sized 3-D model. The extracted significant features are then re-sized by a factor of 10/1 back to the original size of the 3-D model (using known digital processing techniques) and the position, size and shape of the re-sized extracted significant features are visually compared by the creator to the position, size and shape of corresponding significant features extracted from the original 3-D model.

If the position, size and shape of the re-sized extracted significant features, after comparison by the creator to the position, size and shape of corresponding significant features extracted from the original 3-D model, results in a difference greater than a threshold, at least one of the position, size and shape of the significant features of the 3-D cueing model are adjusted so as to minimize the difference. The author iteratively performs this process for a plurality of scale changes of the original 3-D model, so as to develop, if necessary, one or more optimized cueing models. Each cueing model comprises a set of significant features having a relative position, size and shape optimized for comparing with significant features of an original 3-D model scaled within a range of corresponding sizes.

When a user desires to print a digital 3-D model that the user has accessed or otherwise been provided, in accordance with embodiments described herein, the 3-D model, typically re-sized by the user before printing, and now referred to as a "test model", is processed to extract significant features. Extraction of the significant features from test model is performed in the same manner as the extraction of the significant features from the original 3-D model in order to form the cueing model, as described above in this description. The 3-D printing software compares the size, shape and position of the extracted significant features from the test model with the size, shape and position of the significant features that are provided in the cueing model. Comparison is necessary because if features determined to be significant for having a faithful reproduction are not of the same size, position and shape in the test model, then upon printing of the 3-D model re-sized for printing, it will most likely be visibly different from the digital original 3-D model. Thus, based on the comparison, the test model is adjusted by the 3-D printing software, in accordance with the above description for FIGS. 10 and 11, so that the relative position, size and shape of the extracted significant features of the test model correspond, within a predetermined threshold of design choice, with the position, size and shape of corresponding significant features in the cueing model. In this regard, the 3-D printing software knows the layer thickness to be used to print the 3-D model, and therefor can use an appropriate one a plurality of 3-D cueing files that may be provided, that is designated to use with a particular re-sizing of the 3-D model.

The thus adjusted re-sized volume representation of the test model is then considered the 3-D model for printing, and as such, is then applied to a 3-D printer for printing. Upon printing of the adjusted and re-sized volume representation of the 3-D model for printing, a resized version of the original sized 3-D model should be faithfully reproduced.

The embodiments described herein may be embodied as methods, apparatus, electronic devices, and/or computer program products. Accordingly, the embodiments described herein may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for preserving structural integrity of 3-D models when printing at varying scales comprising:
   extracting a first set of structural features from an original scale 3-D model, wherein the first set of structural features represent structural aspects of the original scale 3-D model;
   grouping the extracted structural features to form a 3-D cueing model, wherein the 3-D cueing model comprises an entry for each structural feature of the first set of structural features and each structural feature's corresponding position, shape, and size;
   creating a resized 3-D model from the original scale 3-D model;
   extracting a second set of structural features from the resized 3-D model, wherein the second set of structural features represent structural aspects of the resized 3-D model;
   adjusting the resized 3-D model based on a comparison of the second set of structural features from the resized 3-D model to the first set of structural features in the 3-D cueing model; and
   providing the adjusted resized 3-D model as a 3-D model for printing.

2. The method of claim 1, further comprising:
   scaling the original scale 3-D model into a plurality of scaled 3-D models having scale sizes different from the original scale;
   extracting the first set of structural features from the plurality of scaled 3-D models;
   determining adjustments to the first set of structural features for the plurality of scaled 3-D models, wherein the adjustments maintain the structural aspects of the original scale 3-D model;
   creating sets of adjusted structural features based on the adjustments; and
   assembling the sets of adjusted structural features into the 3-D cueing model.

3. The method of claim 1, wherein:
   creating the resized 3-D model from the original scale 3-D model comprises scaling the resized 3-D model to a scale different from the scale of the original scale 3-D model;
   extracting the second set of structural features from the resized 3-D model comprises extracting the second set of structural features from the scaled resized 3-D model;
   adjusting the resized 3-D model comprises adjusting the scaled resized 3-D model by comparing at least one of the position, shape, and size of the second set of structural features from the scaled resized 3-D model to at least one of the position, shape, and size the first set of structural features in the 3-D cueing model; and
   providing the adjusted resized 3-D model for printing comprises providing the adjusted scaled resized 3-D model for printing.

4. The method of claim 1, wherein extracting the first set of structural features from the original scale 3-D model comprises converting the original scale 3-D model into an octree representation.

5. The method of claim 4, wherein extracting the first set of structural features from the original scale 3-D model further comprises performing combinatorial optimization on nodes of the octree representation to determine structural features of significance in the octree representation to be extracted from the octree representation.

6. The method of claim 5, wherein the combinatorial optimization further comprises determining structural features that are axially aligned with the octree representation and structural features that are diagonally aligned with the octree representation.

7. The method of claim 5, wherein the combinatorial optimization further comprises determining structural features that reside at different depths within the octree representation.

8. A non-transitory computer readable medium storing instructions thereon that, when executed by at least one processor, cause a computer system to preserve structural integrity of 3-D models when printing at varying scales by performing steps comprising:
creating a resized 3-D model from an original scale 3-D model;
extracting a first set of structural features from the resized 3-D model, wherein the first set of structural features represent structural aspects of the resized 3-D model;
accessing a 3-D cueing model comprising a second set of structural features representing structural aspects of the original scale 3-D model, wherein the 3-D cueing model further comprises an entry for each structural feature of the second set of structural features and each structural feature's corresponding position, shape, and size;
adjusting the resized 3-D model based on a comparison of the first set of structural features from the resized 3-D model to the second set of structural features in the 3-D cueing model; and
providing the adjusted resized 3-D model as a 3-D model for printing.

9. A system for preserving structural integrity of 3-D models when printing at varying scales comprising:
at least one processor; and
at least one non-transitory computer readable storage medium storing instructions that, when executed by the at least one processor, cause the system to:
extract a first set of structural features from an original scale 3-D model, wherein the first set of structural features represent structural aspects of the original scale 3-D model;
group the first set of structural features to form a 3-D cueing model, wherein the 3-D cueing model comprises an entry for each structural feature of the first set of structural features and each structural feature's corresponding position, shape, and size;
create a resized 3-D model from the original scale 3-D model;
extract a second set of structural features from the resized 3-D model, wherein the second set of structural features represent structural aspects of the resized 3-D model;
adjust the resized 3-D model based on a comparison of the second set of structural features from the resized 3-D model to the first set of structural features in the 3-D cueing model; and
provide the adjusted resized 3-D model as a 3-D model for printing.

10. The system of claim 9, further comprising instructions that, when executed by the at least one processor, cause the system to:
scale the original scale 3-D model into a plurality of scaled 3-D models having scale sizes different from the original scale;
extract the first set of structural features from the plurality of scaled 3-D models;
determine adjustments to at least one of the position, shape, and size of the first set of structural features for the plurality of scaled 3-D models, wherein the adjustments maintain the structural aspects of the original scale 3-D model;
create sets of adjusted structural features based on the adjustments; and
assemble the sets of adjusted structural features into the 3-D cueing model.

11. The system of claim 9, wherein:
the instructions that cause the system to create the resized 3-D model from the original scale 3-D model comprise instructions that, when executed by the at least one processor, cause the system to scale the resized 3-D model to a scale different from the scale of the original scale 3-D model;
the instructions that cause the system to extract the second set of structural features from the resized 3-D model comprise instructions that, when executed by the at least one processor, cause the system to extract the second set of structural features from the scaled resized 3-D model;
the instructions that cause the system to adjust the resized 3-D model comprise instructions that, when executed by the at least one processor, cause the system to adjust the scaled resized 3-D model by comparing at least one of the position, shape, and size of the second set of structural features from the scaled resized 3-D model to the first set of structural features in the 3-D cueing model; and
the instructions that cause the system to provide the adjusted resized 3-D model as the 3-D model for printing comprise instructions that, when executed by the at least one processor, cause the system to provide the adjusted scaled resized 3-D model for printing.

12. The system of claim 9, wherein extracting the first set of structural features from the original scale 3-D model comprises converting the original scale 3-D model into an octree representation.

13. The system of claim 12, wherein extracting the first set of structural features from the original scale 3-D model further comprises performing combinatorial optimization on nodes of the octree representation to determine structural features of significance in the octree representation to be extracted from the octree representation.

14. The system of claim 13, wherein the combinatorial optimization further comprises determining structural features that are axially aligned with the octree representation and structural features that are diagonally aligned with the octree representation.

15. The system of claim 13, wherein the combinatorial optimization further comprises determining structural features that reside at different depths within the octree representation.

16. The non-transitory computer readable medium of claim 8, wherein adjusting the resized 3-D model comprises shrinking one of the first set of structural features.

17. The non-transitory computer readable medium of claim 8, wherein:
creating the resized 3-D model from the original scale 3-D model comprises scaling the resized 3-D model to a scale different from the scale of the original scale 3-D model;
extracting the first set of structural features from the resized 3-D model comprises extracting the first set of structural features from the scaled resized 3-D model;
adjusting the resized 3-D model comprises adjusting the scaled resized 3-D model by comparing the first set of structural features from the scaled resized 3-D model to the second set of structural features in the 3-D cueing model; and
providing the adjusted resized 3-D model for printing comprises providing the adjusted scaled resized 3-D model for printing.

18. The non-transitory computer readable medium of claim 8, wherein comparing the first set of structural features from the scaled resized 3-D model to the second set of structural features in the 3-D cueing model comprises comparing at least one of the position, shape, and size of the first set of structural features from the scaled resized 3-D model to at least one of the position, shape, and size of the second set of structural features in the 3-D cueing model.

19. The non-transitory computer readable medium of claim 8, creating the resized 3-D model from the original scale 3-D model comprises converting the original scale 3-D model to a volume representation format and a scale for a given printer.

20. The non-transitory computer readable medium of claim 8, wherein adjusting the resized 3-D model comprises enlarging one of the first set of structural features.

\* \* \* \* \*